United States Patent
Heinkel et al.

(10) Patent No.: US 6,351,091 B1
(45) Date of Patent: Feb. 26, 2002

(54) ELECTRONICALLY COMMUTATABLE MOTOR

(75) Inventors: Hans-Martin Heinkel, Stuttgart; Gerhard Knecht, Iffezheim; Rainer Josef Berger, Remscheid, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/620,941

(22) Filed: Jul. 21, 2000

(30) Foreign Application Priority Data

Jul. 23, 1999 (DE) ......................................... 199 34 668

(51) Int. Cl.$^7$ ................................................. H02P 6/14
(52) U.S. Cl. ........................ 318/254; 318/138; 318/439
(58) Field of Search ................. 318/254, 138, 318/439

(56) References Cited

U.S. PATENT DOCUMENTS

| | | | | |
|---|---|---|---|---|
| 5,191,270 A | * | 3/1993 | McCormack | 318/254 |
| 5,327,053 A | * | 7/1994 | Mann et al. | 318/254 |
| 5,821,713 A | * | 10/1998 | Holling et al. | 318/439 |
| 5,982,117 A | * | 11/1999 | Taylor et al. | 318/254 |
| 5,986,419 A | * | 11/1999 | Archer et al. | 318/254 |
| 5,990,643 A | * | 11/1999 | Holling et al. | 318/254 |

* cited by examiner

*Primary Examiner*—Robert E. Nappi
*Assistant Examiner*—Rita Leykin
(74) *Attorney, Agent, or Firm*—Kenyon & Kenyon

(57) ABSTRACT

An electronically commutable motor, whose excitation windings can be fed with current via semiconductor output stages from an electronic control unit using pulse-width modulated control signals and, in this context, which generate a rotating field in the stator of the motor, the rotating field placing the permanent magnet of the motor in rotational motion. Without position sensors, a reliable start-up in the rotational direction is achieved even given a high mass moment of inertia, a small cogging inertia, and poor damping such that, during the start-up of the motor, the control unit, during a specific or specifiable start-up phase, drives the semiconductor output stages in overlapping control phases using PWM control signals, whose pulse-width ratio rises from a minimum to a maximum and then falls again to the minimum, that the overlapping areas of the control phases in the affected excitation windings generate currents which yield a virtually continuous torque curve, and that, in the start-up phase, by shortening the commutation time between the control phases, coming after one another, the commutation frequency and thus the rotational speed of the motor is increased.

10 Claims, 3 Drawing Sheets

ELECTRONICALLY COMMUTATABLE MOTOR

FIELD OF THE INVENTION

The present invention relates to an electronically commutable motor, whose excitation (magnet) windings can be supplied with current via semiconductor output stages from an electronic control unit using pulse-width modulated control signals and, in this context, which generate a rotating (magnetic) field in the stator of the motor, the rotating field placing the permanent magnet of the motor in rotational motion.

BACKGROUND INFORMATION

In electronically commutable motors, it is necessary to know the position of the permanent magnet rotor with respect to the stator furnished with excitation windings, in order that, given the intended commutation of the excitation windings, the motor, during start-up, is set in rotational motion in the desired rotational direction.

Motors of this type are known that have position sensors, using which the position of the switched-off motor can be made recognizable. These motors require not only supplemental position sensors, but they also require additional outlays in the PWM control unit.

In motors not having position sensors, the position of rotor and stator is detected by evaluating the voltages induced in the excitation windings. However, since when the motor is at rest no voltages are induced that can be evaluated, position detection is not possible when the motor is at rest. Therefore, in starting the determination, a start-up of the motor is not guaranteed, particularly not in the desired rotational direction.

As U.S. Pat. No. 5,327,053 shows, an electronically commutable motor not having position sensors can also be started in the correct rotational direction if, in the start-up phase, a specified position of rotor and stator is first brought about through different currents being supplied to the excitation windings, and the usual flow of current is begun only later. In this context, at the beginning, two excitation windings are fully supplied with current at the same time, and thereafter the current is supplied that is necessary to generate the rotational field having the desired rotational direction.

In this context, however, it has been shown that this driving (activation) in the start-up phase presumes a relatively small mass moment of inertia in the rotor, a high cogging torque, and a powerfully dampened system. This known start-up procedure can therefore not be successfully transferred to motors which do not have these properties.

SUMMARY OF THE INVENTION

Therefore, it is an objective of the present invention, in an electronically commutable motor of the type mentioned above having a high mass moment of inertia, a small cogging torque, and poor damping, and not having position sensors, to assure, during start-up, a start in the desired rotational direction.

This objective is achieved according to the present invention due to the fact that, in the start-up of the motor, the control unit, during a specific or specifiable start-up phase, drives the semiconductor output stages in overlapping control phases using PWM control signals, whose pulse-width ratio rises from a minimum to a maximum and then falls again to the minimum, that the overlapping areas of the control phases in the affected excitation windings generate currents which yield a virtually continuous torque curve, and that, in the start-up phase, by shortening the commutation time between successive control phases, the commutation frequency and therefore the rotational speed of the motor is increased.

In the control phases, the excitation windings are supplied with current through the semiconductor output stages having a switching (operating) frequency of the PWM control signals, the pulse-width ratio PWV—the ratio of pulse width to period—rising from a minimum to a maximum and then falling once again to the minimum. Since the control phases of the excitation windings overlap, the torque is also modulated and, by adjusting the overlapping areas of the control phases of the excitation windings, in the start-up phase, a virtually uniform torque curve can be attained in the desired rotational direction, leading to a reliable start-up in the correct rotational direction. The increase in the rotational speed in the start-up phase is achieved by shortening the commutation time, which occurs continuously in the start-up phase. The commutation time is a function of the motor parameters and is adjusted accordingly.

In accordance with one embodiment, a change in the pulse-width ratio in the control phases can be carried out such that the pulse-width ratio in the control phases increases from the value "0" to the value "1" and then sinks again to the value "0," the pulse-width ratio being defined as the ratio of pulse width to the period of the PWM control signal, and that the pulse-width ratio, in the start-up phase of the control phases of the PWM control signals, changes over time between the minimum and maximum in a roughly sinusoidal manner.

In accordance with one embodiment, the start-up phase can be defined such that it is selected as a set point time, within which the engine carries out roughly 10 rotations.

According to one embodiment, a quieter and more rapid start-up of the motor is achieved due to the fact that the commutation frequency in the start-up phase increases disproportionately as the time increases.

If, according to a further embodiment, it is provided that the amplitude of the pulse-width ratio in the start-up phase continuously increases and, in continuous running of the motor, gradually changes to a value that is specified through a set point value fed to the control unit, then the motor can be operated in continuous running at varying rotational speeds, the pulse-width ratio PWV taking on the value "1" in rated operation at full load.

In order to obtain a uniform torque curve, the adjustment of the overlapping areas of successive control phases is made easier by the fact that the overlapping of control phases that follow one another in time is smaller than one half the period of the control phases.

In the control phases, the PWM control signals are clocked at a switching frequency of, e.g., 20 kHz.

DETAILED DESCRIPTION

Figure 1:
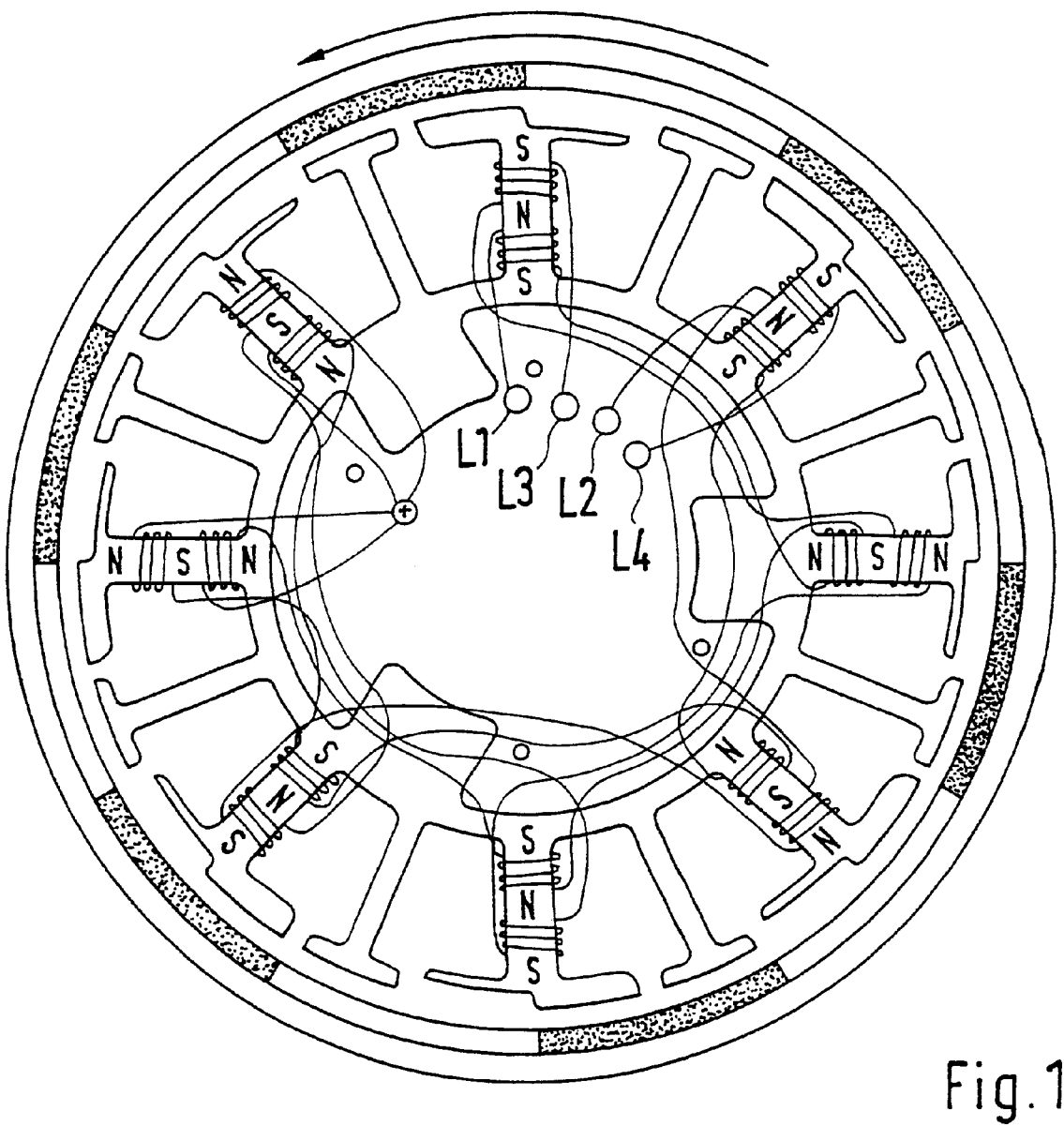
FIG. 1 depicts a 2-phase, 4-pulse motor.

The design of a 2-phase, 4-pulse motor is depicted in FIG. 1. In this context, for generating a rotational (magnetic) field in the stator, a control unit STE-PWM is required for the rotational direction depicted by the arrow, as FIG. 2 indicates.

The stator has eight poles, between which, in each case, is arranged an interpole that is not provided with a winding. Excitation windings L1, L2, L3, and L4, are each provided with four partial windings, as can be seen from FIG. 1, the partial windings being distributed among four poles. In this context, the winding direction changes from partial winding to partial winding, and the partial windings of one excitation winding are distributed to poles between which is arranged, in each case, a pole that is not covered therewith. In addition, excitation windings L1 and L3 as well as L2 and L4 cover the same pole, but on each pole they have contrary directions of winding.

If these excitation windings L1 through L4 are determined by the control unit STE-PWM as being temporally successive, then the desired rotational field arises in the stator.

Figure 2:
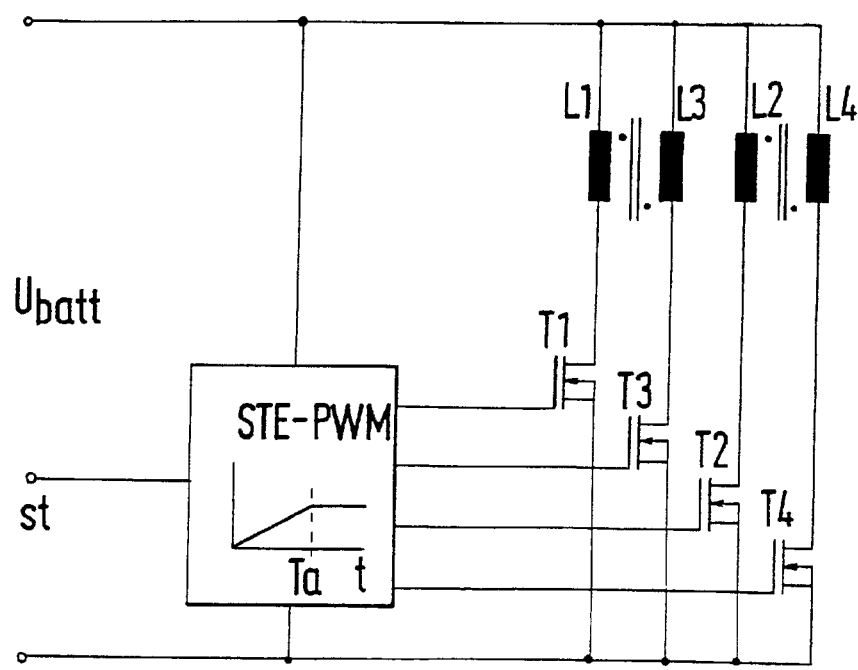
FIG. 2 depicts schematically the drive of the four excitation windings of the motor according to FIG. 1.
Figure 3:
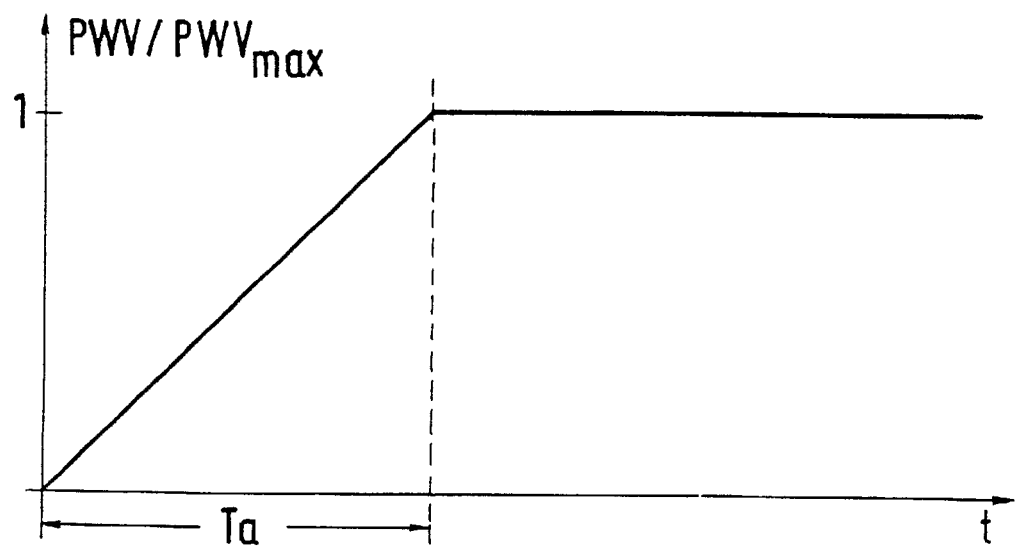
FIG. 3 depicts the curve of the amplitude of the pulse-width ratio of the PWM control signals in the start-up phase.

As the circuit diagram according to FIG. 2 indicates, excitation windings L1 through L4 are switched on and off via semiconductor output stages T1, T2, T3, and T4, i.e., connected to the DC voltage supply $U_{bett}$ and separated from it.

As is indicated by a diagram in the control unit STE-PWM, during the start-up, the driving of the motor takes place in a start-up phase Ta, which extends over a specific or specifiable time.

In start-up phase Ta, the amplitude of pulse-width ratio PWV continuously increases. Pulse-width ratio PWV indicates the ratio of pulse width to the period of the switching frequency of the PWM control signals, and the amplitude is therefore defined as $PWV/PWM_{max}$. After start-up phase Ta, the amplitude takes the value "1," if the amplitude is assigned to the rated operation of the motor at full load.

If a set point value that is assigned to a rotational speed is specified for control unit STE-PWM, then the motor can be operated at differing rotational speeds through a corresponding adjustment of the amplitude of the pulse-width ratio PWV and/or pulse-width in the switching periods.

The start-up of the motor and the run-up to the rated rotational speed is assured as a result of the fact that four semiconductor output stages T1 through T4 have assigned to them four overlapping control phases, in which PWM control signals are supplied, e.g., having the switching frequency of 20 kHz. In the control phases, pulse-width ratio PWV changes from a minimum $PWV_{min}$ to a maximum $PWV_{max}$ and once again falls to minimum $PWV_{min}$. The time offset of the control phases is characterized as commutation time K-time and determines commutation frequency fk and, therefore, the rotational speed of the motor.

Figure 5:
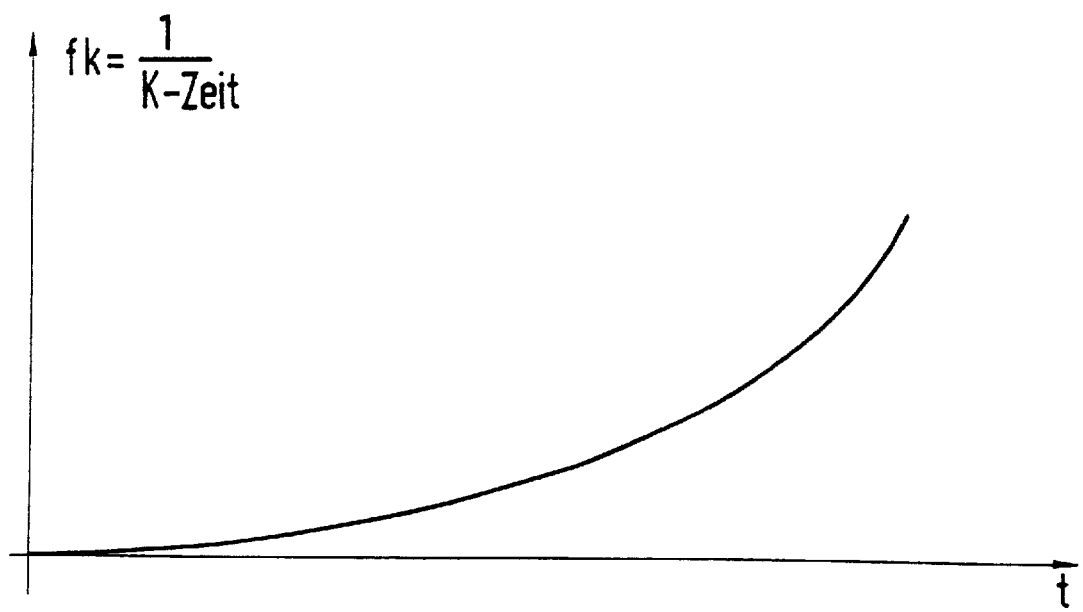
FIG. 5 depicts the curve of the commutation frequency in the start-up phase of the motor.

The overlapping areas of the control phases in pulse-width ratio PWV are adjusted to each other such that in start-up phase Ta a roughly uniform torque curve is always attained. The K-time is continuously shortened in start-up phase Ta, as FIG. 5 shows, so that the motor runs up to the minimal rotational speed of continuous running. In this context, commutation frequency fk and the rotational speed increase disproportionately, as the time increases. For pulse-width ratio PWV, minimum $PWV_{min}$ can have the value "0" and maximum $PWV_{max}$ the value "1." The transition between these values can take place, e.g., in a roughly sinusoidal manner, and it must be adjusted to the design and parameters of the motor in order to obtain the uniform torque curve in start-up phase Ta that is necessary for a reliable start. Start-up phase Ta can be determined by stipulating a time within which the motor can carry out a preselected number of rotations, e.g., 10.

Figure 4:
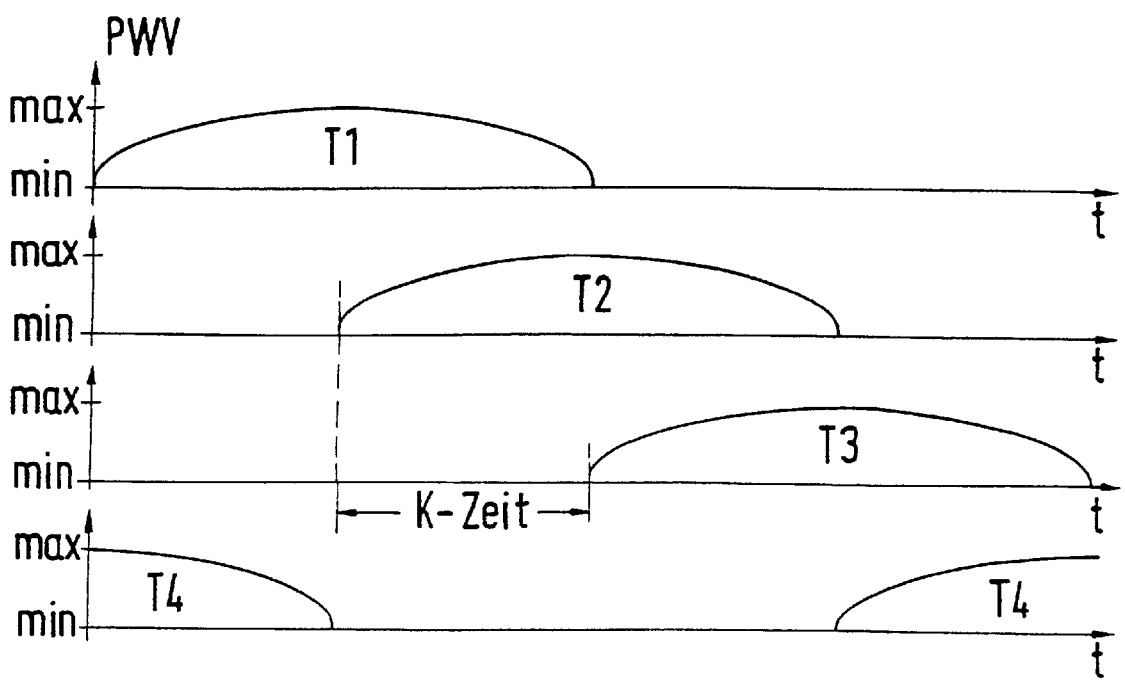
FIG. 4 depicts the control phases, offset in time, for the four excitation windings of the motor according to FIG. 1.

As is shown in FIG. 4, the overlapping of adjacent control phases extends over one half the period of the control phases. This means that shortening commutation time K-time also correspondingly shortens the period of the control phases. In the control phases, the switching frequency of the PWM control signals usually remains the same, e.g., 20 kHz. What is changed is usually the pulse width. The sequence of control phases during start-up and during continuous running remains the same.

The start-up phase is stored as software in a microcomputer of control unit STE-PWM.

What is claimed is:

1. An electrically commutable motor comprising:

excitation windings;

a stator;

a permanent magnet rotor;

semiconductor output stages; and an electronic control unit for providing pulse-width modulated control signals to the output stages to supply current to the excitation windings, a magnetic field being generated in the stator, the magnetic field setting the rotor in rotational motion, wherein, during a preselected start-up phase of the motor, the control unit drives the output stages in overlapping control phases using the pulse-width modulated control signals, a pulse-width ratio of the control signals rising from a minimum to a maximum and then falling again to the minimum, wherein overlapping areas of the control phases generate in affected areas of the excitation windings currents which yield a substantially continuous torque curve, and wherein, in the start-up phase, by shortening a commutation time between successive ones of the control phases, a commutation frequency and, thus, a rotational speed of the motor are increased.

2. The motor according to claim 1, wherein the pulse-width ratio in the control phases increases from a value "0" to a value "1" and falls again to the value "0", the ratio being defined as a ratio of a pulse width to a period of a control signal.

3. The motor according to claim 1, wherein the start-up phase is selected as a set point time within which the motor executes about 10 rotations.

4. The motor according to claim 1, wherein the commutation frequency in the start-up phase rises disproportionately as time increases.

5. The motor according to claim 1, wherein an amplitude of the pulse-width ratio in the start-up phase continuously increases and, in continuous running of the motor, changes over to a value, the value being specified by a set point value supplied to the control unit.

6. The motor according to claim 1, wherein, in rated operation at full load, the pulse-width ratio of the control signals takes on a value of "1".

7. The motor according to claim 1, wherein the pulse-width ratio in the start-up phase of the control phases of the control signals changes over time in a substantially sinusoidal manner between the minimum and the maximum.

8. The motor according to claim 1, wherein an overlapping of the control phases that follow each other in time is smaller than one half a period of the control phases.

9. The motor according to claim 1, wherein the control signals have a switching frequency of 20 kHz.

10. The motor according to claim 1, wherein the start-up phase is stored as software in a microcomputer of the control unit.

* * * * *